US007831479B2

(12) United States Patent
Scargill et al.

(10) Patent No.: US 7,831,479 B2
(45) Date of Patent: Nov. 9, 2010

(54) METHOD AND PROGRAM PRODUCT FOR CONDUCTING AN ELECTRONIC AUCTION INCLUDING THE AUTOMATIC EXTENSION OF AUCTION END TIME

(76) Inventors: Lawson S. Scargill, 498 E. Main St., Defuniak Springs, FL (US) 32435; Diane K. Wospil, 5315 US Hwy 331 5th, Defuniak Springs, FL (US) 32435

( * ) Notice: Subject to any disclaimer, the term of this patent is extended or adjusted under 35 U.S.C. 154(b) by 1107 days.

(21) Appl. No.: 11/478,056

(22) Filed: Jun. 29, 2006

(65) Prior Publication Data
US 2008/0004975 A1 Jan. 3, 2008

(51) Int. Cl.
G06Q 30/00 (2006.01)
G06F 17/30 (2006.01)
(52) U.S. Cl. .......................................... 705/26; 705/27
(58) Field of Classification Search ............. 705/26–27, 705/37
See application file for complete search history.

(56) References Cited

U.S. PATENT DOCUMENTS

| 6,058,417 | A  | * | 5/2000  | Hess et al. ................ 709/219 |
| 6,199,050 | B1 | * | 3/2001  | Alaia et al. ................ 705/37 |
| 6,216,114 | B1 | * | 4/2001  | Alaia et al. ................ 705/37 |
| 6,223,167 | B1 | * | 4/2001  | Alaia et al. ................ 705/37 |
| 2001/0027434 | A1 | * | 10/2001 | Alaia et al. ................ 705/37 |
| 2001/0032175 | A1 | * | 10/2001 | Holden et al. ............... 705/37 |
| 2002/0042769 | A1 | * | 4/2002  | Gujral et al. ............... 705/37 |
| 2002/0087456 | A1 | * | 7/2002  | Abeshouse et al. .......... 705/37 |
| 2002/0169705 | A1 | * | 11/2002 | Gutierrez et al. ........... 705/37 |
| 2003/0220867 | A1 | * | 11/2003 | Goodwin et al. ............ 705/37 |
| 2004/0083156 | A1 | * | 4/2004  | Schulze ..................... 705/37 |
| 2005/0108125 | A1 | * | 5/2005  | Goodwin et al. ............ 705/35 |

OTHER PUBLICATIONS

Army Reverse Auctions: An E-Commerce Acquisition Tool.(electronic commerce). Elgart, Edward G. Public Manager, vol. 30, No. 1, p. 13, Spring 2001.*

* cited by examiner

Primary Examiner—William Allen
(74) Attorney, Agent, or Firm—J. Wiley Horton

(57) ABSTRACT

A method of extending the closing point in a timed on-line auction. The method establishes a fixed closing time for the on-line auction. The system then monitors for the placement of a bid within a first fixed time period proximate the closing point. If a bid is received during the first fixed time period, then the timed auction is extended for a first extended time period (which may be the same length as the first fixed time period). The process then repeats by monitoring for the receipt of a bid during the first extended time period. If a bid is received, then the timed auction is extended for a second extended time period. The extensions will continue until no bid is received during an extended time period, at which point the auction will finally close.

16 Claims, 5 Drawing Sheets

INFORMATION ABOUT EXTENDED TIME
— 38

WHENEVER A BID IS RECEIVED IN THE FINAL 2 MINUTES OF THE AUCTION PERIOD, THE AUCTION PERIOD WILL BE EXTENDED FOR ANOTHER 2 MINUTES. THE EXTENSIONS OF TIME WILL CONTINUE INDEFINITELY UNTIL NO RAISING BID IS RECEIVED FOR A PERIOD OF 2 MINUTES.

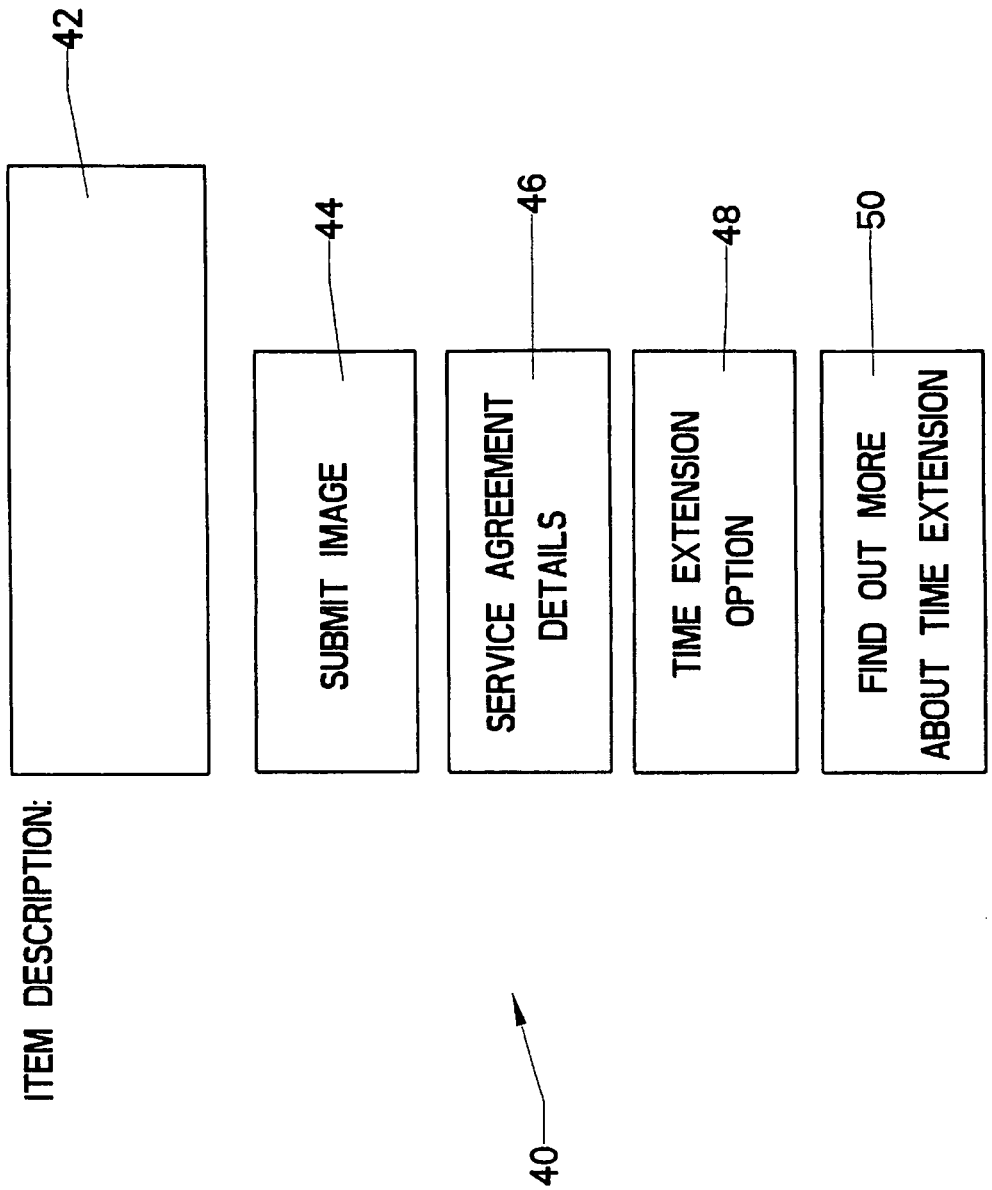

METHOD AND PROGRAM PRODUCT FOR CONDUCTING AN ELECTRONIC AUCTION INCLUDING THE AUTOMATIC EXTENSION OF AUCTION END TIME

BACKGROUND OF THE INVENTION

1. Field of the Invention

This invention relates to the field of on-line product sales. More specifically, the invention comprises a method for extending the termination point of a timed auction in order to maximize the price bid for items sold over the Internet.

2. Description of the Related Art

Many products are now sold over the worldwide electronic communication network known as the Internet. Many methods are used to sell the products, with the "electronic auction" being one particularly popular format. In this format, an item for sale is displayed for viewing on remotely-located computer terminals and remote users submit "bids" in electronic form. There are many websites currently using this format, with the site owned by eBay, Inc., of San Jose, Calif. being the most popular.

The company conducting the electronic auction stores information on a computer "server." Remote "client" users are allowed to create accounts on this server. The client-users are thereby registered to take place in one or more auctions.

The registration process includes information such as the client-user's name, email address, and physical address. During an on-line auction, the remote client-users electronically submit bids to the hosting server. A website display is provided by the hosting server so that the client-users can view details regarding the auction. The displayed information is regularly updated for all participants to see.

As will be known to those skilled in the art, data must be transmitted back and forth between the host-server computer and the client-user computer. The host-server data is used to update the web page display on the client-user's computer monitor. Data (such as a "bid") can likewise be transmitted from the client-user to the host-server, where it can be displayed on the web page shown to all users. This exchange of data and presentation of displays on computer monitors are well known in the art, so these operations will not be described in further detail. However, the user should understand that the drawings included in this specification represent simplified computer "web page" type displays. Many different formats could be used for such displays and the invention is certainly not confined to any one format.

While electronic auctions have been highly successful in recent years, they have assumed a format which differs substantially from live auctions. It is impractical to have a live "auctioneer" conducting every auction of every item sold on line. Thus, many providers use a time limit to bring an auction to a close.

FIG. 1 shows a representative display presented to a prospective bidder in a prior art on-line auction. Item identification display 12 includes a digital image 10 and a text description 14. These are typically provided by the seller. Bid button 16 can be activated by a pointing device such as a mouse or touch pad. Once actuated, the user is prompted to enter a bid in bid entry box 18. The current maximum bid is shown in current bid indicator 20.

End time display 22 shows the time at which the auction is set to close. A countdown box—which shows the time remaining—may also be included. In the example, the current bid is $150. Some auctions impose a minimum increment, which would also be displayed on the page. If, as an example, the minimum increment is set at five dollars, then a client-user would have to submit a bid of $155 to become the current top bidder.

The depictions shown are rather simplistic. Actual web pages for an on-line auction often include dialogue boxes displayed on two or more pages with the user being prompted to select additional "layered" windows.

By definition, timed auctions remain open until the time runs out. The client-user who has submitted the highest bid at the instant the auction closes becomes the winning bidder. Such a system is easily automated. It also provides a clear criterion for selecting the winning bidder. Unfortunately, however, the arbitrary time criterion produces unwanted behavior.

Live auctions are an effective system for obtaining the fair market value of the items sold. In fact, the competitive nature of a live auction can even produce inflated sale prices. The dynamic of a timed, on-line auction is fundamentally different. Rather than submitting a well-reasoned bid, many users will monitor the auction and wait for the last possible moment to bid. A flurry of bids is then submitted in the closing seconds. This phenomenon is so well known that many people now earn a living as professional "bid submitters." They are hired for their ability to time the closing of timed auctions.

The losing bidders would have frequently been willing to pay more for the item. They simply ran out of time. Thus, the seller has lost the opportunity to obtain the best possible price. The losing bidders have lost the opportunity to make a purchase at a price they were willing to pay. These issues frustrate market optimization. The present invention seeks to remedy these shortcomings by selectively extending the closing point of timed on-line auctions.

BRIEF SUMMARY OF THE PRESENT INVENTION

The present invention comprises a method of extending the closing point in a timed on-line auction. The method establishes a fixed closing time for the on-line auction. The system then monitors for the placement of a bid within a first fixed time period proximate the closing point. If a bid is received during the first fixed time period, then the timed auction is extended for a first extended time period (which may be the same length as the first fixed time period).

The process then repeats by monitoring for the receipt of a bid during the first extended time period. If a bid is received, then the timed auction is extended for a second extended time period. The extensions will continue until no bid is received during an extended time period, at which point the auction will finally close.

The method allows bidding to continue so long as the price is still being raised. Only when no client-user is willing to raise the bid further will the timed auction close.

BRIEF DESCRIPTION OF THE SEVERAL VIEWS OF THE DRAWINGS

FIG. 5 shows a representative display screen used to receive information from prospective sellers.

REFERENCE NUMERALS IN THE DRAWINGS

| | |
|---|---|
| 10 image | 12 item identification display |
| 14 text description | 16 bid button |
| 18 bid entry box | 20 current bid indicator |
| 22 end time display | 24 extended time indicator |
| 26 remaining time indicator | 28 information button |
| 30 bid type entry box | 32 pull-down menu |
| 34 bid type selection | 36 amount entry box |
| 38 information text | 40 seller input screen |
| 42 text input box | 44 image link button |
| 46 agreement link button | 48 time extension button |
| 50 time extension information button | |

DETAILED DESCRIPTION OF THE INVENTION

The present inventive method is intended to be implemented over the Internet. Those familiar with web page design will know that many different user interfaces can be easily created. The drawings forming part of this specification are intended to be simple renditions presenting the basic components needed to implement the inventive method. Many other variations are possible. Thus, the drawings should be viewed as exemplary.

Figure 1:
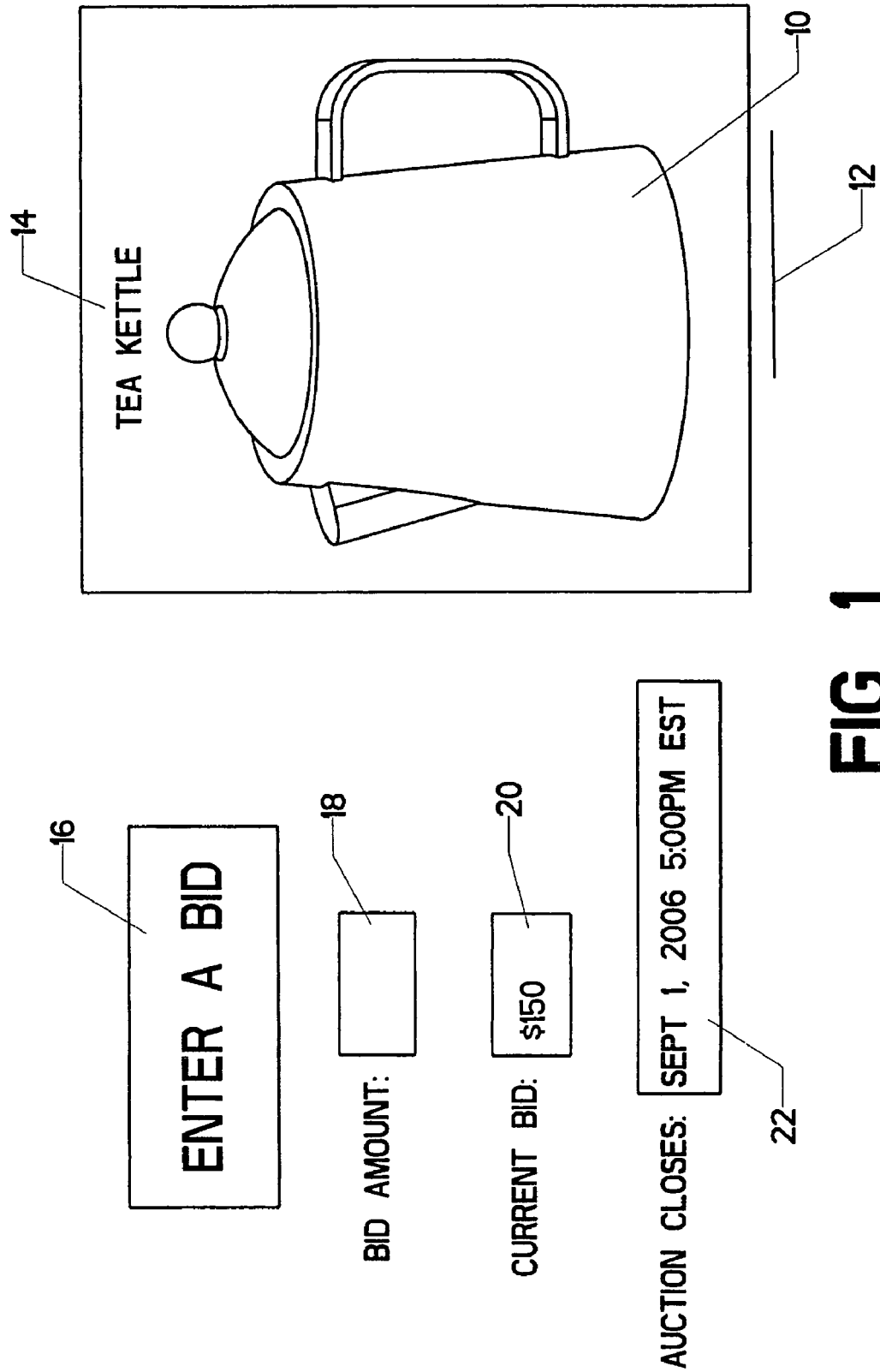
FIG. 1 shows a typical screen display used in a prior art timed electronic auction.

The initial screen presented to the client-user could be the same as the prior art rendition shown in FIG. 1. An auction closing time is stated and the client-users submit bids up until that time. However, several additional steps have been added to the classic timed auction. A first time period is established covering the closing minutes of the timed auction. While the duration of this time period is a matter of choice, a two minute long first time period would be appropriate.

In the example of FIG. 1, the timed auction is set to close at 5:00 P.M. The first time period would then run from 4:58 P.M. to 5:00 P.M. Between 4:58 P.M. and 5:00 P.M., the host-server would monitor for the submission of a bid from any client-user. If a bid is submitted during that interim, then the closing time would be extended by adding a first extended time period.

Figure 2:
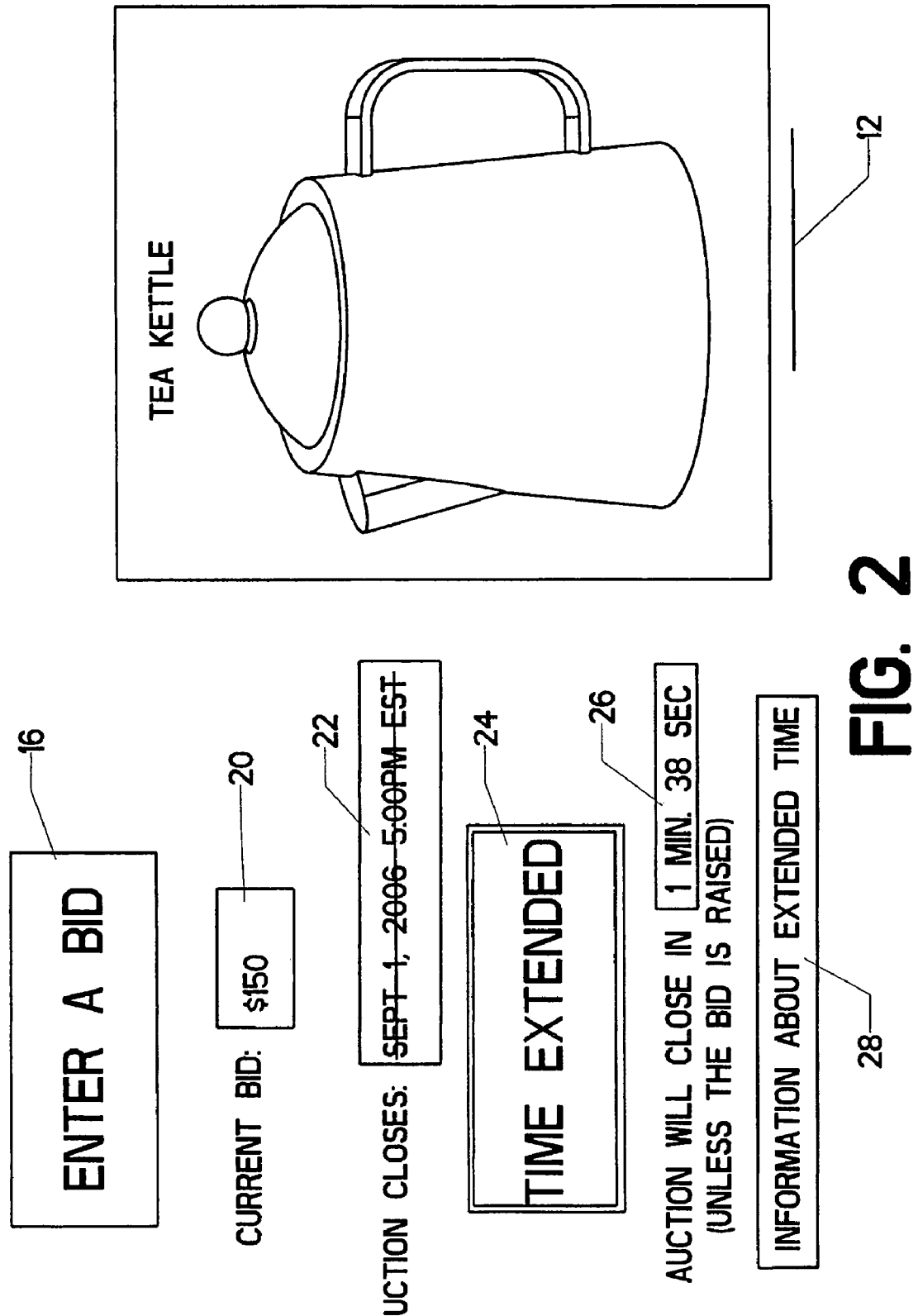
FIG. 2 shows a representative screen display used to implement the present invention.

The duration of the first extended time period could be independently selected. However, setting this duration equal to the first time period is a convenient choice. Continuing the example of FIG. 1, the closing time would be extended by two minutes. A new display would be presented to the client-users. FIG. 2 shows one such possible display. The bid button, item identification display, and current bid indicators remain the same. However, end time display 22 is now shown with a line struck through the original ending time.

Extended time indicator 24 appears. This feature is preferably displayed prominently, such as by using a contrasting color or flashing "lights." Remaining time indicator 26 counts down the time remaining in the first extended time period.

The present inventive method monitors for the submittal of a bid during the first extended time period. If a bid is received during this time, then a second extended time period is created. The process can continue indefinitely. The auction will only close when no additional bids are received for the length of an extended time period.

Figure 4:
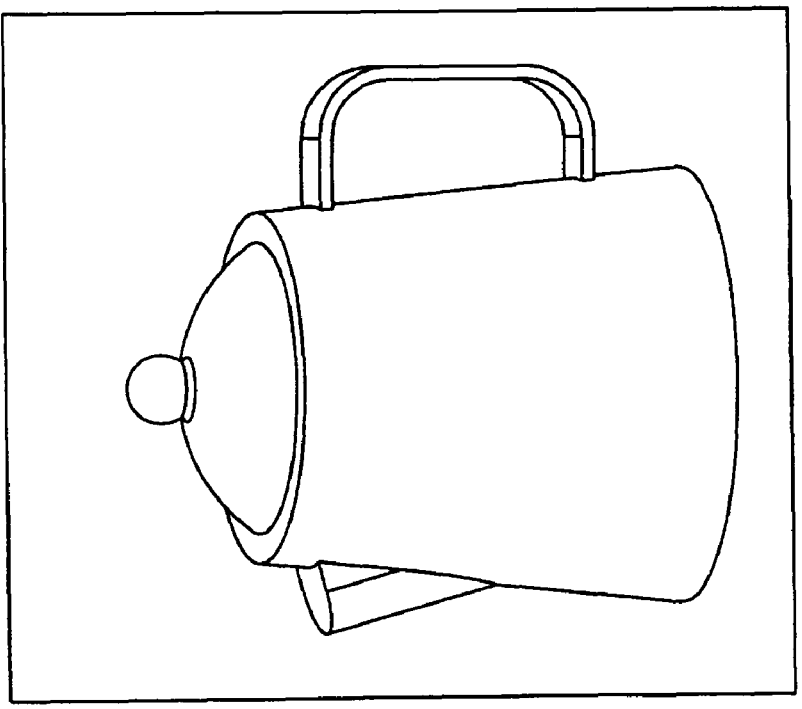
FIG. 4 shows a screen display used to provide on-line bidders with information about the extended time periods.

The display of FIG. 2 preferably includes additional features. Since some users will not be familiar with the present modification to the well-established timed auction format, information button 28 is provided. If a client-user activates this button, then an information screen such as shown in FIG. 4 will be shown to that particular client-user only. Information text 38 provides a general explanation about the time extension format. It may also be helpful to include a remaining time indicator 26 on this display so that the client-user does not unintentionally allow the remaining time to run out.

Returning now to FIG. 2, the experienced client-user will readily understand the fact that the time has been extended. The present invention extends the time for bidding until no further bids are presented. Thus, the experienced client-user will also realize that there is no point in trying to "time" the closure of the auction, since submitting a bid near the closing time will only serve to further extend the auction.

Figure 3:
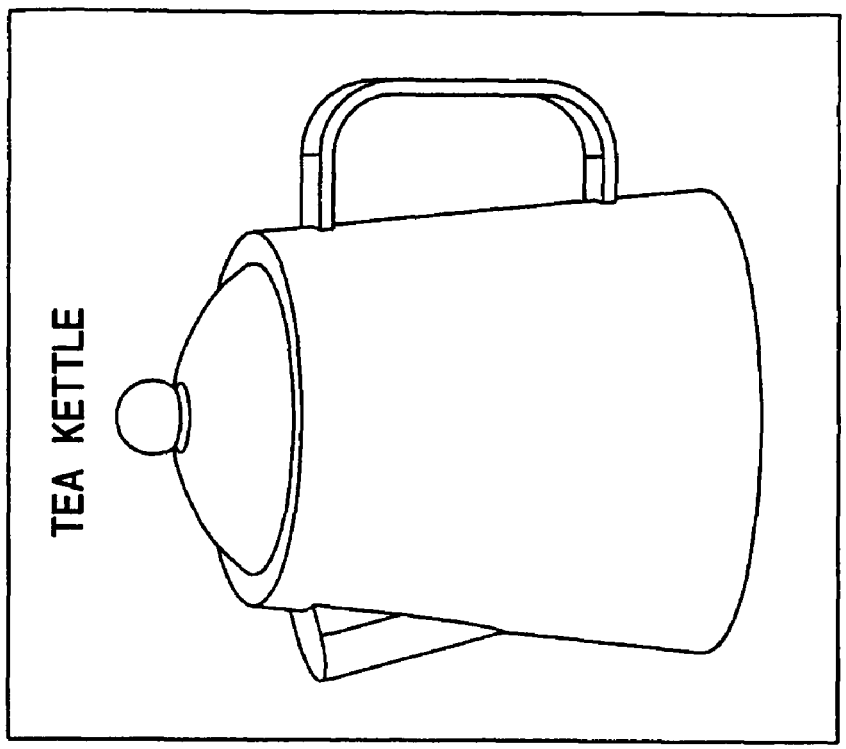
FIG. 3 shows a display used to enter a bid type and a bid amount.
Figure 3:
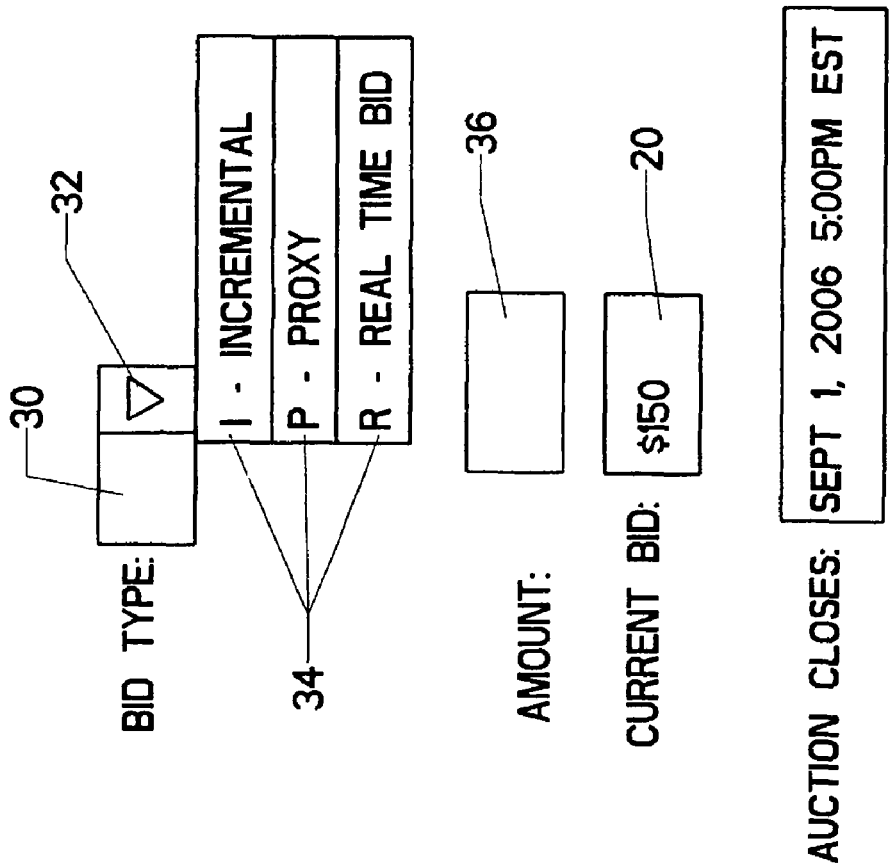

If a user actuates bid button 16, he or she will be shown a display such as depicted in FIG. 3. In a simple embodiment, the user might only be shown amount entry box 36, which would allow the user to enter an amount and transmit the amount to the host-server. However, those skilled in the art will know that additional complexity is already present in many on-line auction sites.

It can be helpful to allow the user to submit different types of bids. An "incremental" bid simply adds a fixed incremental bid to the current bid. A "proxy" bid allows the user to submit the maximum amount that he or she is willing to pay (sometimes with an incremental bid increase value as well). As an example, the user might view the current bid of $150 and decide that she is willing to pay $225 for the item. The user submits the $225 figure as a "proxy" bid. The host-server would then bid for the user, typically using a fixed increment.

The fixed increment might be $5. The client-user could then log off and do other things. The host-server would automatically submit a $155 bid. It would thereafter keep submitting higher bids as needed in order to ensure that the client-user submitting the $225 proxy bid remains the highest bidder. Of course, if the bidding exceeds $225, then the proxy bidding process will not submit any more bids for that particular client-user.

On the other hand, a user may simply wish to submit a real-time bid. Such a tactic might be employed to "scare away" less serious bidders by raising the bid substantially. With the current bid at $150, a client-user may enter a real-time bid of $250. Bid type entry box 30 allows a user to select the type of bid before entering an amount. Pull-down menu 32 can be provided to automate the selection choices. If a user hits the pull-down, bid type selections 34 are shown. The user then picks one of these which will be automatically inserted into the bid type entry box. The user next places a dollar figure in amount entry box 36. The bid is then submitted to the host-server.

Example One

The bidding process will continue until no further bids are received during one of the extended time periods. An example may prove helpful in understanding the process. Returning to FIG. 1, assume the timed auction is set to close at 5:00 P.M. EST. The following events then occur, following the present inventive method:

1. At 4:59:20, a raising bid is submitted by a first client-user. The host-server then creates a first extended time period, and the auction is extended until 5:02 P.M.;

2. At 5:01:30, a raising bid is submitted by a second client-user. The host-server then creates a second extended time period, and the auction is extended until 5:04 P.M.;

3. At 5:01:45, the first client-user raises the bid. Since the auction is already extended beyond the first extended time period, this bid has no effect on the closing time;

4. At 5:03:10, the second client-user raises the bid. The host-server then creates a third extended time period, and the auction is extended until 5:06 P.M.;

5. Between 5:04 P.M. and 5:06 P.M. (the third extended time period), no more bids are submitted. Thus, no more extended time periods are created and the auction closes at 5:06 P.M. At that point, the second client-user becomes the winning bidder.

Example Two

The extended time periods can be implemented in other ways as well. As one example, the extended time period might commence at the instant that a bid is submitted (rather than commencing at the end of the current time period). This example again assumes that the timed auction is set to close at 5:00 P.M. The following events then occur, following an alternate embodiment of the present inventive method:

1. At 4:59:10, a raising bid is submitted by a first client-user. The host-server then creates a first extended time period, commencing at 4:59:10 and the auction is extended until 5:01:10 P.M.;

2. At 5:00:30, a raising bid is submitted by a second client-user. The host-server then creates a second extended time period, and the auction is extended until 5:02:30 P.M.;

3. No further bids are submitted. Thus, no more extended time periods are created and the auction closes at 5:02:30 P.M. At that point, the second client-user becomes the winning bidder.

Many other variations are possible. However, the key steps in the present inventive process can be summarized as follows:

1. Establishing a closing time for an electronic auction;

2. Establishing a time window which opens shortly before the closing time and closes at the closing time;

3. Monitoring for the submittal of a bid during that time window;

4. If a bid is submitted during that time window, extending the closing time for an additional period; and 5. Continuing to extend the closing time as needed, so long as additional bids are being submitted.

In this fashion, no willing bidder is closed out by the timing of the auction. Rather, each client-user should have the opportunity to continue bidding until the point where he or she believes that the bid price has become too high.

The method thus disclosed will tend to increase revenue for the seller. In no case will it reduce the revenue that would be obtained by a conventional timed auction, since the bid price in the extended period will always start with what would have been obtained in a timed auction. As most host-servers charge a fee based on a percentage of the total sale price, the revenue for the host-server will also increase.

The reader may naturally wish to know how the inventive method would appear from the perspective of the seller. A seller typically logs onto the host-server's website and goes through a process to place the item up for sale. FIG. 5 shows a depiction of what the seller might see. Text input box 42 allows the seller to enter information describing the item for sale. Image link button 44 allows the seller to submit a digital image which will then be posted on the host-server's website. Agreement link button 46 allows the seller to review his or her service agreement with the host-server.

Time extension button 48 and time extension information button 50 are added. If the user selects the information button, a text screen describing the present inventive method will be displayed. Experienced sellers will simply select the time extension button and then go through implementing the time extension process.

Many different options could be made available. As an example, the host-server might charge a fixed fee if the seller selects the time extension option. The host-server could also incrementally sell the option, such as by providing a charge for one extended time period, a charge for two extended time periods, and a charge for unlimited extended time periods.

While FIG. 5 shows the time extension option being implemented up front, this need not be the case. The extension option could be made available to the seller at any time during the auction. It could also be made available to bidders as well, so that anyone could elect to trigger the time extension option (either at no charge or upon payment of a fee).

The drawing figures accompanying this explanation show representative web pages implementing the invention. Those skilled in the art will realize that the method claimed herein could be graphically depicted in many different ways. Thus, the drawings should be viewed as only one embodiment among many possible embodiments.

Although the preceding description contains significant detail, it should not be construed as limiting the scope of the invention but rather as providing illustrations of the preferred embodiments of the invention. The inventive process could be carried out in many different ways. Thus, the scope of the invention should be fixed by the following claims rather than the examples given.

We claim:

1. A computer program product, comprising a non-transitory computer readable storage medium having computer executable program code embodied therein, said computer executable program code adapted to implement a method of conducting an electronic auction, said electronic auction being hosted by a host-server which is connected over an electronic communication network to at least one seller and a plurality of client-users, the method comprising:
  a. providing a first graphical user interface by said host-server having a first template to be completed by said seller;
  b. collecting a first set of information regarding said electronic auction, said first set of information input by said seller using said first template, wherein said first template includes a time extension button selectable by said seller;
  c. setting a closing time for said electronic auction;
  d. establishing a first time period which commences proximate to said closing time and ends at said closing time;
  e. providing a second graphical user interface having a second template to be completed by at least one of said plurality of said client-users during said first time period, wherein, said second template includes a time extension button selectable by at least one of said plurality of said client-users;
  f. monitoring, by said host-server, said second template for the submission of at least one bid by one of said client-users during said first time period;
  g. in response to detecting at least one bid by one of said client-users during said first time period, revising said closing time by adding a first extended time period; and
  h. in response to detecting that at least one client-user has selected the time extension button associated with said second template, triggering a time extension option responsive to payment of a fee by said at least one client-user who selected the time extension button associated with said second template.

2. A computer program product for conducting an electronic auction as recited in claim 1, wherein said first extended time period commences immediately after said closing time.

3. A computer program product for conducting an electronic auction as recited in claim 1, wherein said first extended period commences immediately after said detection of said at least one bid.

4. A computer program product method-for conducting an electronic auction as recited in claim 1, wherein further comprising:
   a. monitoring for the submission of a bid by one of said client-users during said first extended time period; and
   b. in the event that at least one bid by one of said client-users during said first extended time period is detected, revising said closing time by adding a second extended time period.

5. A computer program product for conducting an electronic auction as recited in claim 4, wherein said second extended time period commences immediately after said first extended time period.

6. A computer program product for conducting an electronic auction as recited in claim 4, wherein said second extended time period commences immediately after said detection of said at least one bid during said first extended time period.

7. A computer program product for conducting an electronic auction as recited in claim 4, further comprising:
   a. monitoring for the submission of a bid by one of said client-users during said second extended time period; and
   b. in the event that at least one bid by one of said client-users is detected during said second extended time period, revising said closing time by adding a third extended time period.

8. A computer program product for conducting an electronic auction as recited in claim 7, wherein said third extended time period commences immediately after said second extended time period.

9. A computer program product for conducting an electronic auction as recited in claim 4, wherein said third extended time period commences immediately after said detection of said at least one bid during said second extended time period.

10. A computer program product for conducting an electronic auction as recited in claim 1, wherein:
    a. a fee is collected for said host-server; and
    b. said fee is charged to said seller when said seller elects said time extension button option on said first template.

11. A computer program product for conducting an electronic auction as recited in claim 1, wherein said second template further comprises:
    a. an incremental bid option which can be selected by said client-user, wherein said client-user sets an amount of money to increase said bid by; and
    b. increasing said bid automatically by said amount of money previously set by said client-user.

12. A computer program product for conducting an electronic auction as recited in claim 11, wherein said second template further comprises:
    a. a proxy bid option which can be selected by said client-user;
    b. wherein said client-user can set a proxy bid amount of money;
    c. wherein said bid is automatically increased by said amount of money previously set by said client-user until said proxy bid amount of money is reached; and
    d. wherein when said proxy bid amount of money is reached said computer program product no longer bids for said client-user.

13. A method of conducting an electronic auction, said electronic auction being hosted by a host-server which is connected over an electronic communication network to at least one seller and a plurality of client-users, the method comprising:
    a. providing a first graphical user interface by said host-server having a first template to be completed by said seller;
    b. collecting a first set of information regarding said electronic auction, said first set of information input by said seller using said first template, wherein said first template includes a time extension button selectable by said seller;
    c. setting a closing time for said electronic auction;
    d. establishing a first time period which commences proximate to said closing time and ends at said closing time;
    e. providing a second graphical user interface by said host-server having a second template to be completed by at least one of said plurality of said client-users during said first time period, wherein, said second template includes a time extension button selectable by at least one of said plurality of said client-users;
    f. monitoring, by said host-server, said second template for the submission of at least one bid by one of said client-users during said first time period;
    g. in response to detecting at least one bid by one of said client-users during said first time period, revising said closing time by said host-server by adding a first extended time period; and
    h. in response to detecting that at least one client-user has selected the time extension button associated with said second template, triggering a time extension option responsive to payment of a fee by said at least one client-user who selected the time extension button associated with said second template.

14. A method for conducting an electronic auction as recited in claim 13, wherein said first extended time period commences immediately after said closing time.

15. A method for conducting an electronic auction as recited in claim 13, wherein said first extended time period commences immediately after said detection of said at least one bid during said first time period.

16. A method for conducting an electronic auction as recited in claim 13, wherein:
    a. a fee for said host-server; and
    b. wherein said fee is charged to said seller when said seller elects said time extension button option on said first template.

* * * * *